(12) United States Patent  
Kawahara

(10) Patent No.: US 8,976,401 B2  
(45) Date of Patent: Mar. 10, 2015

(54) IMAGE FORMING APPARATUS THAT DISPLAYS A PREVIEW OF A DISPLAY IMAGE SHOWING A STATE WHERE AN IMAGE IS FORMED ON A SHEET OF PAPER

(71) Applicant: Sharp Kabushiki Kaisha, Osaka-shi, Osaka (JP)

(72) Inventor: Hisashi Kawahara, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/323,000

(22) Filed: Jul. 3, 2014

(65) Prior Publication Data

US 2015/0022852 A1    Jan. 22, 2015

(30) Foreign Application Priority Data

Jul. 17, 2013    (JP) .................. 2013-148653

(51) Int. Cl.
  *G06F 3/12*   (2006.01)
  *G06K 15/02*  (2006.01)
(52) U.S. Cl.
  CPC .................... *G06K 15/025* (2013.01)
  USPC ........................................ 358/1.15
(58) Field of Classification Search
  None
  See application file for complete search history.

(56) References Cited

U.S. PATENT DOCUMENTS

| | | | | |
|---|---|---|---|---|
| 5,963,216 A | * | 10/1999 | Chiarabini et al. | 345/660 |
| 6,281,983 B1 | * | 8/2001 | Takahashi et al. | 358/1.2 |
| 6,947,159 B1 | * | 9/2005 | Wheeler | 358/1.15 |
| 2004/0042032 A1 | * | 3/2004 | Laughlin | 358/1.15 |
| 2006/0061815 A1 | * | 3/2006 | Iwatani | 358/1.15 |
| 2006/0203289 A1 | * | 9/2006 | Miyata | 358/1.18 |
| 2009/0073476 A1 | * | 3/2009 | Torikoshi | 358/1.13 |
| 2010/0123925 A1 | * | 5/2010 | Tomaru | 358/1.15 |
| 2010/0149598 A1 | * | 6/2010 | Shiohara | 358/1.18 |

FOREIGN PATENT DOCUMENTS

JP    2009-104590 A    5/2009

* cited by examiner

*Primary Examiner* — Jeremiah Bryar
(74) *Attorney, Agent, or Firm* — Birch, Stewart, Kolasch & Birch, LLP

(57) ABSTRACT

In an image forming apparatus provided with an image output portion, paper supply portions, a display image generating portion, a display panel, and an operation unit including an operation unit side control portion having a preview display function, a specified display image generating function and a paper display image generating function are included as the display image generating portion and a specified paper supply portion displaying function and an output state displaying function are included as the operation unit side control portion, for displaying a preview of a situation of a paper supply portion and sheets of paper on the display panel.

8 Claims, 11 Drawing Sheets

IMAGE FORMING APPARATUS THAT DISPLAYS A PREVIEW OF A DISPLAY IMAGE SHOWING A STATE WHERE AN IMAGE IS FORMED ON A SHEET OF PAPER

This Nonprovisional application claims priority under 35 U.S.C. §119(a) on Patent Application No. 2013-148653 filed in Japan on 17 Jul. 2013, the entire contents of which are hereby incorporated by reference.

BACKGROUND OF THE INVENTION (1) Field of the Invention

The present invention relates to an image forming apparatus such as a copier, a printer and a facsimile, and particularly to an image forming apparatus provided with an image display operation device capable of displaying a preview of a display image formed based on image data which is input.

(2) Description of the Prior Art

In recent years, an image forming apparatus has been known that is provided with an image display operation device capable of displaying a preview of a display image formed based on image data which is input. According to such an image forming apparatus, by displaying, on a display screen, a preview of a processing result that a document is scanned (pre-scanned) in advance before executing a job, it is possible to confirm the read document before outputting an image.

For example, such a multi-functional peripheral having a copy function and a fax function has been known that includes a preview function for preventing printing mistakes by displaying an image read by a scanner portion or an image captured from a PC or the like through an I/O portion on a display before printing.

Moreover, a technology for reducing erroneous printing and test printing for a sheet of paper of a special type is disclosed. In Patent Literature 1, a feature of a sheet of paper set on a paper tray is obtained by an image sensor and image data of a document created by an application program is synthesized with image data of the sheet of paper thus obtained to be displayed on a printing preview window (display screen). In the technology described in Patent Literature 1, however, preview display of a back side is not disclosed.

As a technology of preview display of a back side, an image forming apparatus is also known that includes a function for rotating front and back of a preview image according to a flick operation or the like to intuitively grasp how front and back of the image are output. The flick operation is an operation for sliding a finger touching a display screen.

PATENT LITERATURE

Patent Literature 1: Japanese Patent Application Laid-open No. 2009-104590

However, with preview display of front and back by the flick operation, it is possible to confirm front and back of an output image in advance, but it is impossible to confirm for which side of a sheet of paper inserted in a paper tray inside a multi-functional peripheral printing is performed actually. Therefore, processing for confirming an arrangement relation of printed images for the sheet of paper of the paper tray by test printing has been required.

For example, when a sheet of paper whose one side has been printed is set on a manual tray of an image forming apparatus and printing is performed additionally for a side which has not been printed, there is a problem that it is difficult to intuitively recognize for which side printing is performed in current print setting and how a vertical direction of a printing side is reflected to the sheet of paper set on the manual tray.

Further, when output is performed with an orientation of a sheet of paper placed on the manual tray rotated by 90 degrees or printing is performed with an orientation of an image printed on a sheet of paper rotated by 90 degrees, there is a problem that it becomes more difficult to intuitively recognize a finished state.

SUMMARY OF THE INVENTION

The present invention has been made in view of the conventional problems as described above, and an object thereof is to provide an image forming apparatus capable of, in the case of performing output processing in the image forming apparatus, notifying a user what image is to be printed on which side of a sheet of paper supplied from a paper supply portion and preventing setting an orientation of a sheet of paper and back/front of a printing side erroneously.

A first aspect of the present invention is characterized in that an image forming apparatus includes paper supply portions provided at a plurality of places for supplying a sheet of paper, an image output portion for forming and outputting an image based on image data which is input on a sheet of paper supplied from a first paper supply portion which is specified from among the plurality of paper supply portions; and an image display operation device, in which the image display operation device includes a display image generating portion for generating a display image based on the image data before outputting the image to the sheet of paper supplied from the first paper supply portion, a display portion, and a display control portion for displaying the display image on the display portion, the display image generating portion includes a function for generating a first display image showing the first paper supply portion, and a function for generating a second display image showing a state where the image is formed on the sheet of paper supplied from the first paper supply portion when the image data is input as a preview image or a state where a sample image is formed on the sheet of paper before the image data is input as a confirmation image, and the display control portion includes a function for displaying a preview of the first display image on the display portion, and a function for displaying a preview of the second display image.

That is, it is characterized in that content of all pages of image data to be output is displayed on the display portion in a state of being spread to sheets of paper in a manner to be output from a paper supply portion (for example, paper tray).

Moreover, in a second aspect of the present invention, it is preferable that the image forming apparatus described in the first aspect includes, as a configuration of the display control portion, a function for displaying, on the display portion, a paper supply portion in which a sheet of paper selected as a sheet of paper for printing by a user is stored so as to be able to be distinguished from the other paper supply portions, for example, a function for displaying in an opened manner or highlighting.

Moreover, in a third aspect of the present invention, it is preferable that the image forming apparatus described in the first aspect or the second aspect includes, as a configuration of the display control portion, a function for reflecting content of a print setting set by the user to the second display image for preview display.

In the present invention, the print setting includes "printing direction (portrait layout/landscape layout)" by which a layout of a page is set to a portrait layout or a landscape layout, "color printing/monochrome printing" by which color printing or monochrome printing is set, "enlargement/reduction" which is set in the case of printing by enlarging or reducing an image, "N in 1" which is set when images of N pages (N is an integer) are arranged in one page, "simplex printing/duplex printing" by which simplex printing or duplex printing is set, and the like.

Moreover, in a fourth aspect of the present invention, it is preferable that the image forming apparatus described in any one of the first aspect to the third aspect includes, as a configuration of the display control portion, a function for displaying distinctively a front and a back of the sheet of paper in the second display image.

According to the first to fourth aspects of the present invention, since it is possible to notify a user from which paper supply portion in the image forming apparatus a sheet of paper is supplied and on which side of the sheet of paper in a state of being stored in the paper supply portion what image is printed, before actual printing in the image forming apparatus, the user is able to grasp a finished state of printing intuitively.

This makes it possible to store a sheet of paper in a paper supply portion without mistaking an orientation of the sheet of paper nor back/front of a printing side.

DESCRIPTION OF THE PREFERRED EMBODIMENTS

First Embodiment

Description will be hereinafter given for a first embodiment of the present invention with reference to drawings.

Figure 1:
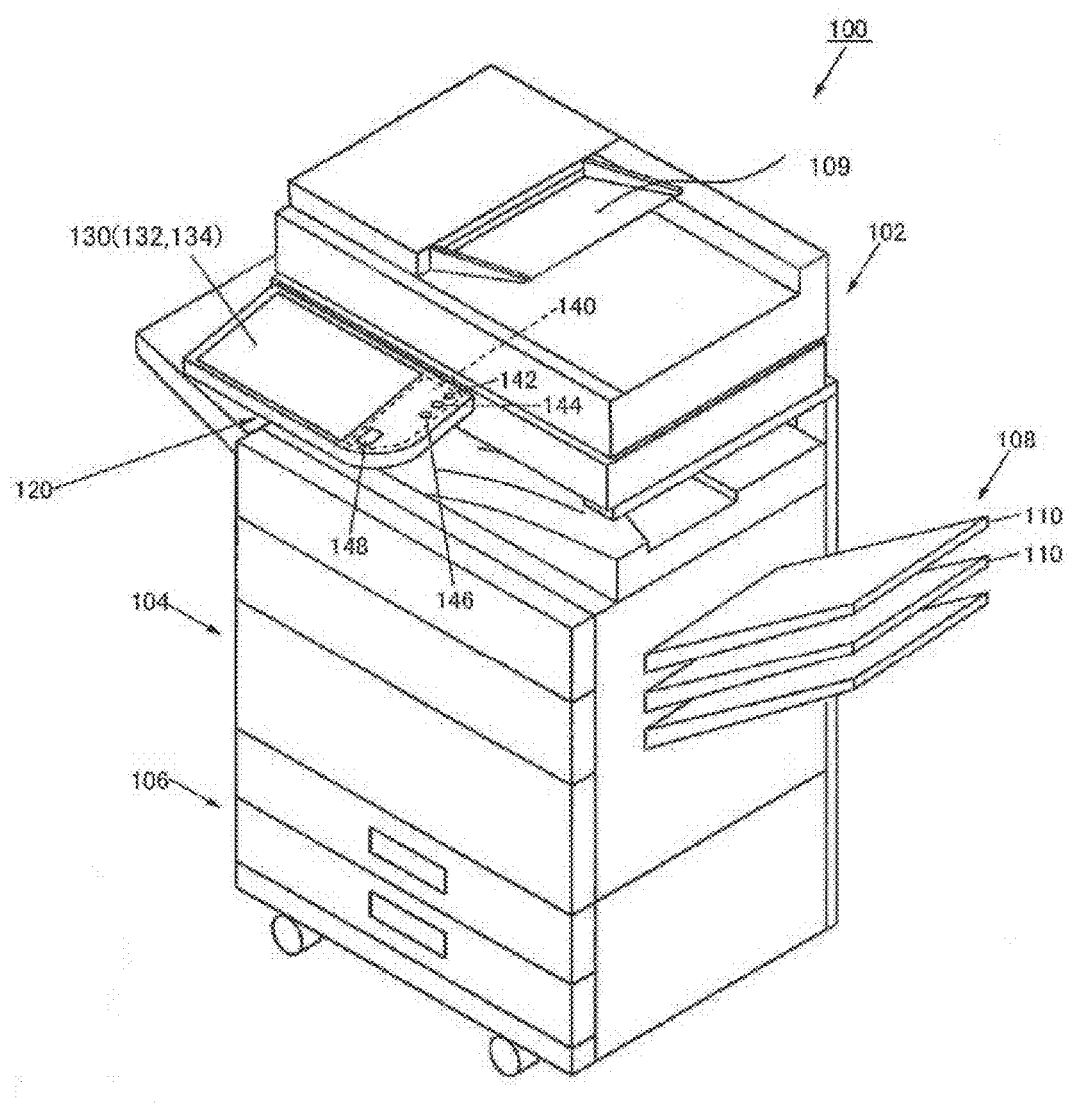
FIG. 1 is an explanatory view showing an entire configuration of an image forming apparatus according to a first embodiment of the present invention.
Figure 2:
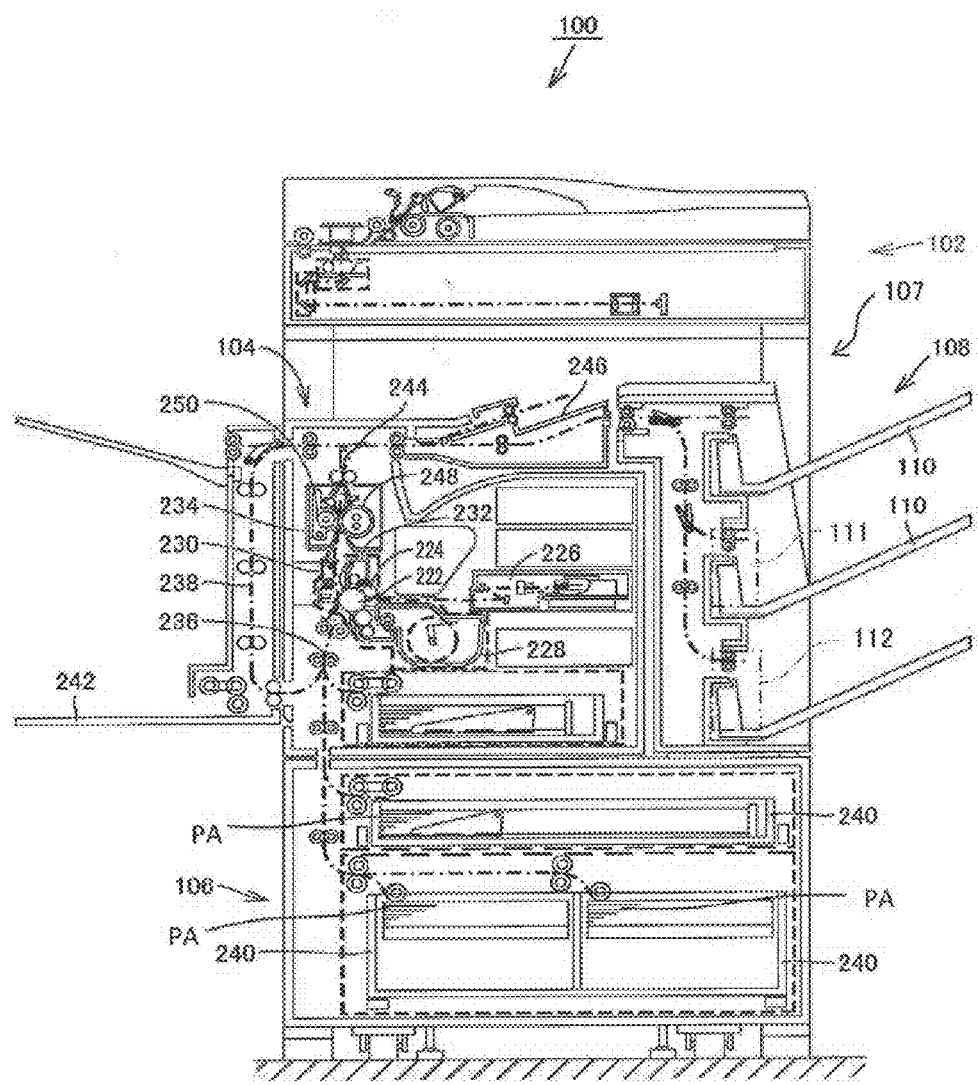
FIG. 2 is an explanatory view showing an internal configuration of the image forming apparatus in a simplified manner.

FIG. 1 is an example of a mode for carrying out the invention, which is an explanatory view showing an entire configuration of an image forming apparatus according to the first embodiment of the present invention, and FIG. 2 is an explanatory view showing an internal configuration of the image forming apparatus in a simplified manner.

An image forming apparatus 100 according to the first embodiment of the present invention is provided with, as shown in FIG. 1, a display panel (display portion) 132, and an operation unit (image display operation device) 120 having a function for displaying a preview of a display image formed based on image data which is input on the display panel 132.

For a document image captured from a document reading portion or the like of the image forming apparatus 100, a preview of an output form of an image to be formed on a sheet of recording paper by an image forming portion of the image forming apparatus 100 is displayed on the display panel 132 as a preview image.

The image forming apparatus 100 according to the present embodiment is an image forming apparatus which is one kind of an image processing apparatus. The image display operation device 120 which is applied to the image forming apparatus 100 according to the present invention may be applied to an image processing apparatus or an electronic device other than such an image forming apparatus.

This image forming apparatus 100 forms an image on a sheet of recording paper by an electrophotographic system.

In addition, the image forming apparatus 100 includes a copy mode, a facsimile mode (FAX mode), a document filing mode (mode of recording a scanned image in a storage device inside the image forming apparatus 100) and a mail mode (mode of transmitting a scanned image in a form of attaching to an electronic mail) as operation modes. Note that, this image forming apparatus 100 may further include a network printer mode.

First, description will be given for a basic configuration of the image forming apparatus 100 according to the first embodiment of the present invention.

The image forming apparatus 100 according to the first embodiment is mainly provided with, as shown in FIG. 1, a document reading portion (input portion) (hereinafter, referred to as "scanner portion") 102 for inputting image data, an image forming portion 104 for forming an image on a recording medium based on image data input by the scanner portion 102, a paper feed portion (paper supply portion) 106 for supplying a sheet of paper, an image output portion 107 for outputting the image formed by the image forming portion 104, a paper output processing device 108, an operation unit 120, and a document platen 109. In the operation modes described above, a document placed on the document platen 109 is sent to the scanner portion 102 and read as image data by the scanner portion 102.

Moreover, the image forming apparatus 100 is provided with, as shown in FIG. 2, a manual tray 242 in addition to the paper feed portion 106 as the paper supply portion for supplying a sheet of paper. A plurality of paper cassettes 240 are stored in the paper feed portion 106 corresponding to types of sheets of paper.

As shown in FIG. 1, the operation unit 120 is mainly provided with a touch panel display 130 and a display operation portion 140. The touch panel display 130 is provided with a display panel 132 configured by a liquid crystal panel and the like, and a touch panel (touch operation confirming portion) 134 which is arranged being overlaid on the display panel 132. The touch panel 134 detects a position pressed by a finger of a user. The display operation portion 140 is provided with a display lamp 142, a power key 144, an energy-saving key 146, and a home key 148 for returning a display screen of the touch panel display 130 to a home screen for selecting an operation mode.

In this manner, the image forming apparatus 100 is provided with the touch panel display 130 as a main operation device as well as is provided with the display operation portion 140 configured by hardware keys (the power key 144, the energy-saving key 146 and the home key 148) and the display lamp 142.

Note that, the operation unit 120 of the image forming apparatus 100 is not limited to one provided with the display operation portion 140 having such a configuration and may be one provided with only the touch panel display 130.

Next, description will be given for operations of the image forming apparatus 100. Here, description will be given taking the copy mode as an example.
(Copy Mode)

In the copy mode, the scanner portion 102 and the image forming portion 104 are mainly operated as shown in FIG. 2.

First, the scanner portion 102 will be described. A document placed on the document platen 109 (FIG. 1) is read by the scanner portion 102 as image data. The read image data is input to a main control portion 101 (FIG. 3) which is a CPU (Central Processing Unit). The image data is subjected to various image processing here, and this image data is output to the image forming portion 104.

Next, the image forming portion 104 will be described. The image forming portion 104 is for printing an image of a document based on image data on a recording medium (in most cases, sheet of recording paper), and is provided with, as shown in FIG. 2, a photoreceptor drum 222, a charging device 224, a laser scanning unit (hereinafter, referred to as "LSU") 226, a developing device 228, a transfer device 230, a cleaning device 232, a fixing device 234, and a charge erasing device which is not shown.

In the image forming portion 104, a main feed path 236 and a reverse feed path 238 are provided. A sheet of recording paper PA fed from the paper feed portion 106 is conveyed along the main feed path 236. The paper feed portion 106 draws out a sheet of recording paper PA stored in the paper cassette 240 or a sheet of recording paper PA placed on the manual tray 242 one by one, and feeds the sheet of recording paper PA to the main feed path 236 of the image forming portion 104.

While the sheet of recording paper PA is being conveyed along the main feed path 236 of the image forming portion 104, the sheet of recording paper PA passes between the photoreceptor drum 222 and the transfer device 230, and further passes through the fixing device 234, whereby printing is performed on the sheet of recording paper PA.

The photoreceptor drum 222 rotates in one direction. Thereby, a surface of the photoreceptor drum 222 is cleaned by the cleaning device 232 and the charge erasing device and, thereafter, uniformly charged by the charging device 224.

The LSU 226 modulates laser beam based on the image data to be printed. The LSU 226 repeatedly scans the surface of the photoreceptor drum 222 with this laser beam in a main scanning direction to form an electrostatic latent image on the surface of the photoreceptor drum 222.

The developing device 228 develops the electrostatic latent image by supplying toner to the surface of the photoreceptor drum 222, and a toner image obtained by attaching toner to the electrostatic latent image is formed on the surface of the photoreceptor drum 222.

The transfer device 230 transfers the toner image on the surface of the photoreceptor drum 222 to the sheet of recording paper PA passing between the transfer device 230 and the photoreceptor drum 222.

The fixing device 234 includes a heating roller 248 for heating the sheet of recording paper PA and a pressing roller 250 for pressing the sheet of recording paper PA. As the sheet of recording paper PA is heated by the heating roller 248 and pressed by the pressing roller 250, the toner image that has been transferred on the sheet of recording paper PA is fixed to the sheet of recording paper PA. A heater is heated by electric power supplied to this fixing device 234 to control so that temperature of the heating roller 248 attains to an appropriate temperature for fixing. Note that, when being shifted to the energy-saving mode, for example, the electric power supplied to this heater is stopped or reduced.

At a position where the main feed path 236 and the reverse feed path 238 are connected, a separation pawl 244 is arranged. When printing is performed only on one side of the sheet of recording paper PA, the separation pawl 244 is positioned and the sheet of recording paper PA from the fixing device 234 is guided to a paper output tray 246 or the paper output processing device 108 by this separation pawl 244.

When printing is performed on both sides of the sheet of recording paper PA, the separation pawl 244 is turned to a prescribed direction, so that the sheet of recording paper PA is guided to the side of the paper output tray 246 temporarily, and thereafter conveyed in a switchback manner to be guided to the reverse feed path 238. The sheet of recording paper PA passes through the reverse feed path 238, is turned upside-down, and fed again to the main feed path 236. At this time, while being fed again along the main feed path 236, printing is performed on the back side thereof, and the sheet is guided to the paper output tray 246 or the paper output processing device 108.

The sheet of recording paper PA which is printed as described above is guided to the paper output tray 246 or the paper output processing device 108 and output to the paper output tray 246. Alternatively, the sheet of recording paper PA which is printed is output to any of the paper output trays 110 of the paper output processing device 108.

The paper output processing device 108 applies processing for sorting a plurality of sheets of recording paper PA to be output to each of the paper output trays 110, processing for punching each sheet of recording paper PA and processing for stapling each sheet of recording paper PA. For example, when a plurality of copies of printed sheet are to be prepared, each of the sheets of recording paper PA is sorted and output to each of the paper output trays 110 such that each copy of printed sheet is assigned to each paper output tray 110 one by one, and each sheet of recording paper PA in each paper output tray 110 is subjected to punching processing by a punching unit 111 or stapling processing by a stapling unit 112 for each paper output tray 110 to thereby prepare the copy of printed sheet.

Next, description will be given for an electric configuration according to screen display of the operation unit 120 in the image forming apparatus 100 of the first embodiment, with reference to a drawing.

Figure 3:
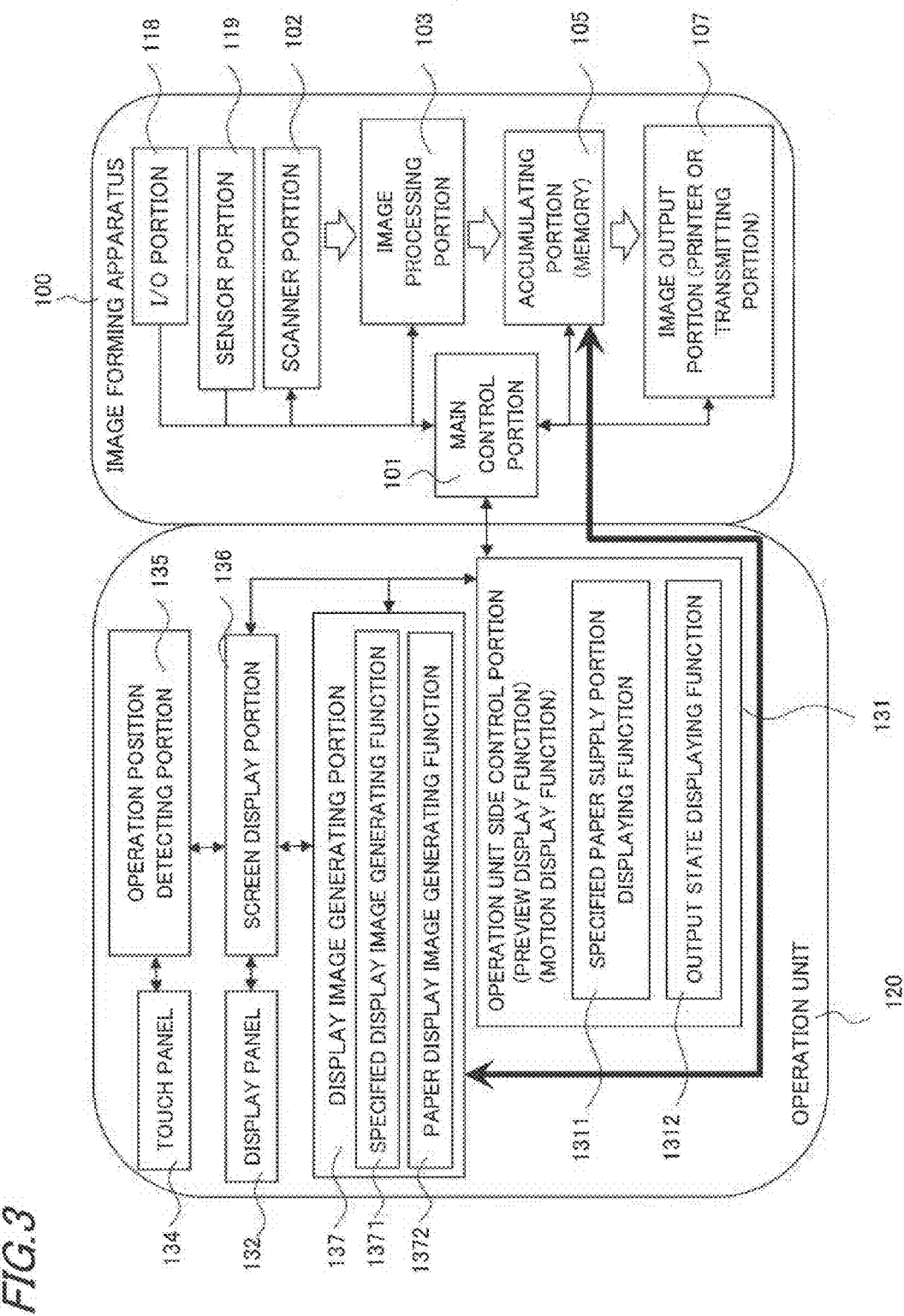
FIG. 3 is a block diagram showing an electric configuration of an operation unit in the image forming apparatus.

FIG. 3 is a block diagram showing the electric configuration of the operation unit in the image forming apparatus of the first embodiment.

As shown in FIG. 3, the operation unit 120 is provided with an operation position detecting portion 135, a screen display portion 136, a display image generating portion 137, and an operation unit side control portion (display control portion) 131 for controlling processing and operations in the operation unit 120, in addition to the display panel 132 and the touch panel 134.

The image forming apparatus 100 is provided with the main control portion 101, the scanner portion 102 for inputting image data, an image processing portion 103, an accumulating portion 105 for accumulating the image data input from the scanner portion 102, and an image output portion 107 for outputting images such as a printer, a transmitting portion and the like. The main control portion 101 controls operations of the image forming apparatus 100.

The operation position detecting portion 135 detects a position of an operation performed on the touch panel 134.

The screen display portion 136 displays an image formed by the display image generating portion 137 on the display panel 132.

The display image generating portion 137 forms a prescribed image in accordance with an instruction from the operation unit side control portion 131 based on the image data input to a main body of the image forming apparatus 100.

In the present embodiment, the display image generating portion 137 includes a specified display image generating function 1371 for generating a first display image which is a display image showing a paper supply portion specified from among the plurality of paper supply portions (the plurality of paper cassettes 240 in the paper feed portion 106 (FIG. 2) and the manual tray 242 (FIG. 2)), and a paper display image generating function 1372 for generating a second display image which is a display image successively showing a state where an image is formed on a sheet of paper supplied from the specified paper supply portion.

The operation unit side control portion 131 is connected to the main control portion 101 of the main body of the image forming apparatus 100 and functions as a control portion in the touch panel display 130 (the display panel 132 and the touch panel 134).

In the present embodiment, the operation unit side control portion 131 includes a preview display function for displaying a preview of a plurality of pages of a document image on the display panel 132 and a motion display function for displaying a plurality of pages of a document image displayed for previewing while moving them.

Further, the operation unit side control portion 131 includes a specified paper supply portion displaying function 1311 for displaying a preview of a display image showing a paper supply portion specified from among the plurality of paper cassettes 240 (FIG. 2) and the manual tray 242 (FIG. 2) (first display image) on the display panel 132, and an output state displaying function 1312 for displaying a preview of a display image successively showing a state where an image is formed on a sheet of paper supplied from the specified paper supply portion (second display image) on the display panel 132.

In addition, the image forming apparatus 100 is provided with an I/O portion 118 for obtaining an image and print setting from an external PC or the like or an internal recording device (storage) at the time of a printing operation, and a sensor portion 119.

The sensor portion 119 is provided in the document platen 109 (FIG. 1), the scanner portion 102 (FIG. 1), and each paper supply portion (each paper cassette 240 (FIG. 2) and the manual tray 242 (FIG. 2)) for detecting an orientation (placement direction) and a size of a document, and an orientation (placement direction), a size and a type of a sheet of paper stored in each paper supply portion.

The sensor portion 119 provided in the document platen 109 directly or indirectly detects an orientation (placement direction) and a size of a document placed on the document platen 109. For example, in the case of indirect detection, a movable document guide is provided in the document platen 109 and the sensor portion 119 provided in the document platen 109 detects an orientation (placement direction) and a size of a document placed on the document platen 109 based on a position at which the document guide of the document platen 109 is set.

When reading a document sent from the document platen 109, the sensor portion 119 provided in the scanner portion 102 directly or indirectly detects an orientation (placement direction) and a size of the document.

The sensor portion 119 provided in each paper supply portion (each paper cassette 240 and the manual tray 242) directly or indirectly detects an orientation (placement direction) and a size of a sheet of paper placed on the paper supply portion. For example, in the case of indirect detection, a movable paper guide is provided in each paper supply portion (each paper cassette 240 and the manual tray 242) and the sensor portion 119 provided in the paper supply portion detects an orientation (placement direction) and a size of a sheet of paper placed on the paper supply portion based on a position at which the paper guide of the paper supply portion is set.

A method for detecting an orientation (placement direction) and a size of a document, and an orientation (placement direction) and a size of a sheet of paper by the sensor portion 119 is not limited thereto. For example, direct detection and indirect detection may be combined.

By associating a specified paper supply portion with a type of a sheet of paper, a type of a sheet of paper stored in each paper supply portion is able to be detected by the sensor portion 119 provided in the paper supply portion. In addition, by associating with a size of a sheet of paper placed on a paper supply portion, a type of a sheet of paper is able to be detected by the sensor portion 119 provided in the paper supply portion. For example, when a sheet of paper placed on a paper supply portion is a postcard, a type of the sheet of paper is able to be detected by the sensor portion 119 provided in the paper supply portion by associating with a size of the postcard.

The image processing portion 103 reflects print setting based on image data obtained from the scanner portion 102 or the I/O portion 118 to create image information due to be output on a sheet of paper.

In the image forming apparatus 100 of the present embodiment, print setting includes "paper direction (portrait/landscape)", "color printing/monochrome printing", "enlargement/reduction", "N in 1", "simplex/duplex" and the like.

In the "paper direction (portrait/landscape)", a longitudinal direction of a sheet of paper is set to a portrait layout or a landscape layout. In the "color printing/monochrome printing", color printing or monochrome printing is set. In the "enlargement/reduction", setting is made in the case of printing by enlarging or reducing an image. In the "N in 1", setting is made when images of N pages (N is an integer) are arranged in one page. In the "simplex/duplex", simplex printing or duplex printing is set.

Note that, content of print setting is not limited thereto and is able to be selected arbitrarily.

Image information due to be output, created in the image processing portion 103, is recorded in the accumulating portion 105.

In the display image generating portion 137, based on an orientation (placement direction), a size and a type of a sheet of paper stored in each paper supply portion detected by the sensor portion 119, the specified display image generating function 1371 generates a display image showing a specified paper supply portion (first display image). The paper display image generating function 1372 generates a display image successively showing a state where an image is formed on a sheet of paper supplied from the specified paper supply portion (second display image) based on the image information due to be output, recorded in the accumulating portion 105.

Then, in the operation unit side control portion 131, the specified paper supply portion displaying function 1311 is configured to display a preview of the first display image generated by the specified display image generating function 1371 on the display panel 132. The output state displaying function 1312 is configured to display a preview of the second display image generated by the paper display image generating function 1372 on the display panel 132.

Next, description will be given for steps for providing preview display on the display panel 132 in the case of performing output processing in the image forming apparatus 100 of the first embodiment, according to flowcharts.

Figure 4:
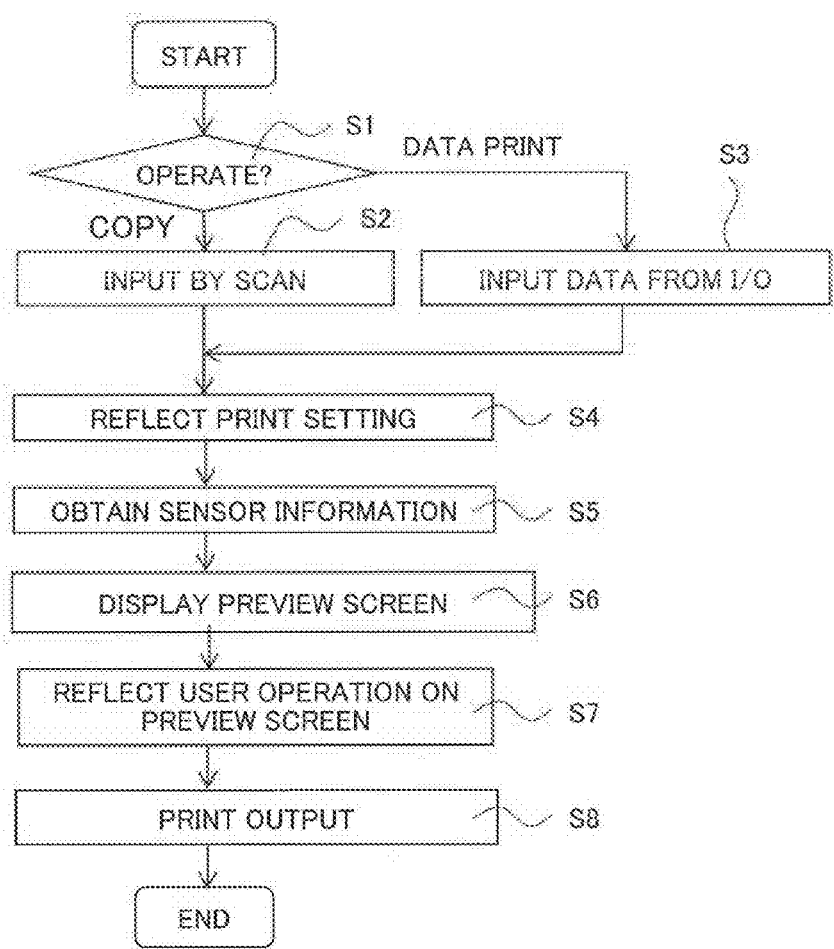
FIG. 4 is a flowchart showing steps for displaying a preview of a situation where a sheet of paper is supplied and output after image data is input in the image forming apparatus.
Figure 5:
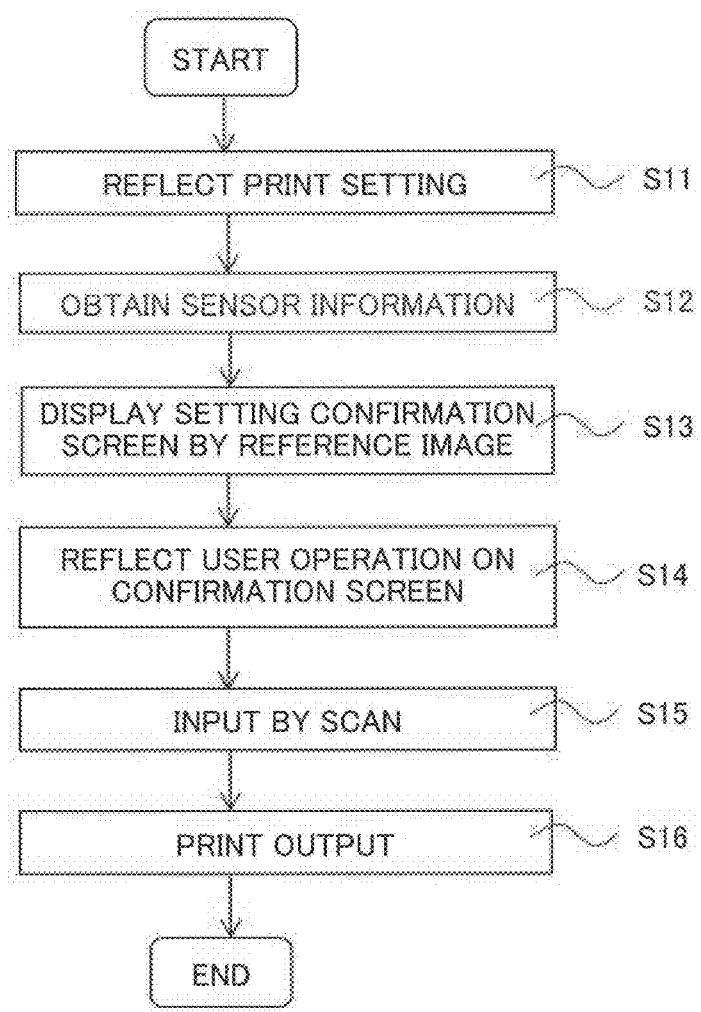
FIG. 5 is a flowchart showing steps for displaying a preview of a situation where a sheet of paper is supplied and output before image data is input in the image forming apparatus.

FIG. 4 is a flowchart showing steps for displaying a preview of a situation where a sheet of paper is supplied and output after image data is input in the image forming apparatus of the first embodiment, and FIG. 5 is a flowchart showing steps for displaying a preview of a situation where a sheet of paper is supplied and output before image data is input in the image forming apparatus.

First, description will be given for a case where a preview of a situation where a sheet of paper is supplied and output after image data is input is displayed in the image forming apparatus 100 of the first embodiment. In this case, input processing (steps S1 to S3), preview image display processing (steps S4 to S7) and output processing (step S8), which will be described below, are executed.

In the image forming apparatus 100 of the first embodiment, input of image data is performed by the scanner portion 102 or the I/O portion 118.

As shown in FIG. 4, for example, when the copy mode described above starts in the image forming apparatus 100, first, it is judged by the main control portion 101 (FIG. 3) whether input of image data is input by document reading with the scanner portion 102 (FIG. 3) or data input with the I/O portion 118 in input processing (step S1).

At step S1, when an image is read from a document by copy processing or the like, input is performed with the scanner portion 102 (step S2). On the other hand, when image data is input by data transmission or the like, the data is input with the I/O portion 118 (step S3).

Next, in preview image display processing, print setting set by a user is reflected to a display image which is displayed for previewing (step S4). Examples of the print setting include "paper direction (portrait/landscape)", "color printing/monochrome printing", "enlargement/reduction", "N in 1" and "simplex/duplex", which are described above, and a size of a sheet of paper and specifying a paper supply portion in which a sheet of paper to be used is stored.

Next, information detected by the sensor portion 119 is obtained (step S5), and a preview image that the information is reflected to a screen of the display panel 132 is displayed on the display panel 132 (step S6). The information detected by the sensor portion 119 includes an orientation (placement direction) and a size of a document, and an orientation (placement direction), a size and a type of a sheet of paper stored in each paper supply portion. Note that, the information detected by the sensor portion 119 may be a part of the above-described information.

Then, a touch operation of the user on the screen of the display panel 132 on which the preview image is displayed (preview screen) is reflected to the preview image to be displayed (step S7). Further, output processing (print output) is executed (step S8). Note that, in the first embodiment, step S8 may be executed after step S6 without executing step S7.

In this manner, the input processing (steps S1 to S3), the preview image display processing (steps S4 to S7) and the output processing (step S8) are executed.

Next, description will be given for a case where a preview of a situation where a sheet of paper is supplied and output before image data is input is displayed in the image forming apparatus 100 of the first embodiment. In this case, confirmation image display processing (steps S11 to S14), input processing (step S15) and output processing (step S16), which will be described below, are executed.

As shown in FIG. 5, for example, when the copy mode described above starts in the image forming apparatus 100, first, print setting set by a user is reflected to a preview image in confirmation image display processing (step S11). Examples of the print setting include "paper direction (portrait/landscape)", "color printing/monochrome printing", "enlargement/reduction", "N in 1" and "simplex/duplex", which are described above, and a size of a sheet of paper and specifying a paper supply portion in which a sheet of paper to be used is stored.

Next, information detected by the sensor portion 119 after a document is placed on the document platen 109 is obtained (step S12), and an image obtained by reflecting the print setting to a reference image (sample image) which is set in advance (hereinafter, referred to as "confirmation image") is displayed on the display panel 132 (step S13). The information detected by the sensor portion 119 includes an orientation (placement direction) and a size of the document, and an orientation (placement direction), a size and a type of a sheet of paper stored in each paper supply portion. Note that, the information detected by the sensor portion 119 may be a part of the above-described information.

Then, a touch operation of the user on the screen of the display panel 132 on which the confirmation image is displayed (confirmation screen) is reflected to the confirmation image to be displayed (step S14).

Note that, step S12 is executed after step S11, but may be executed after step S13 or step S14 as long as after the document is placed on the document platen 109.

Next, in input processing, an image of the document is read with the scanner portion 102 (step S15) and output processing (print output) is executed (step S16). Note that, in the first embodiment, step S15 may be executed after step S13 without executing step S14.

In this manner, the confirmation image display processing (steps S11 to S14), the input processing (step S15) and the output processing (step S16) are executed.

Next, description will be given for preview display displayed on the display panel 132 in the case of performing output processing in the image forming apparatus 100 of the present embodiment, with reference to a drawing.

Figure 6:
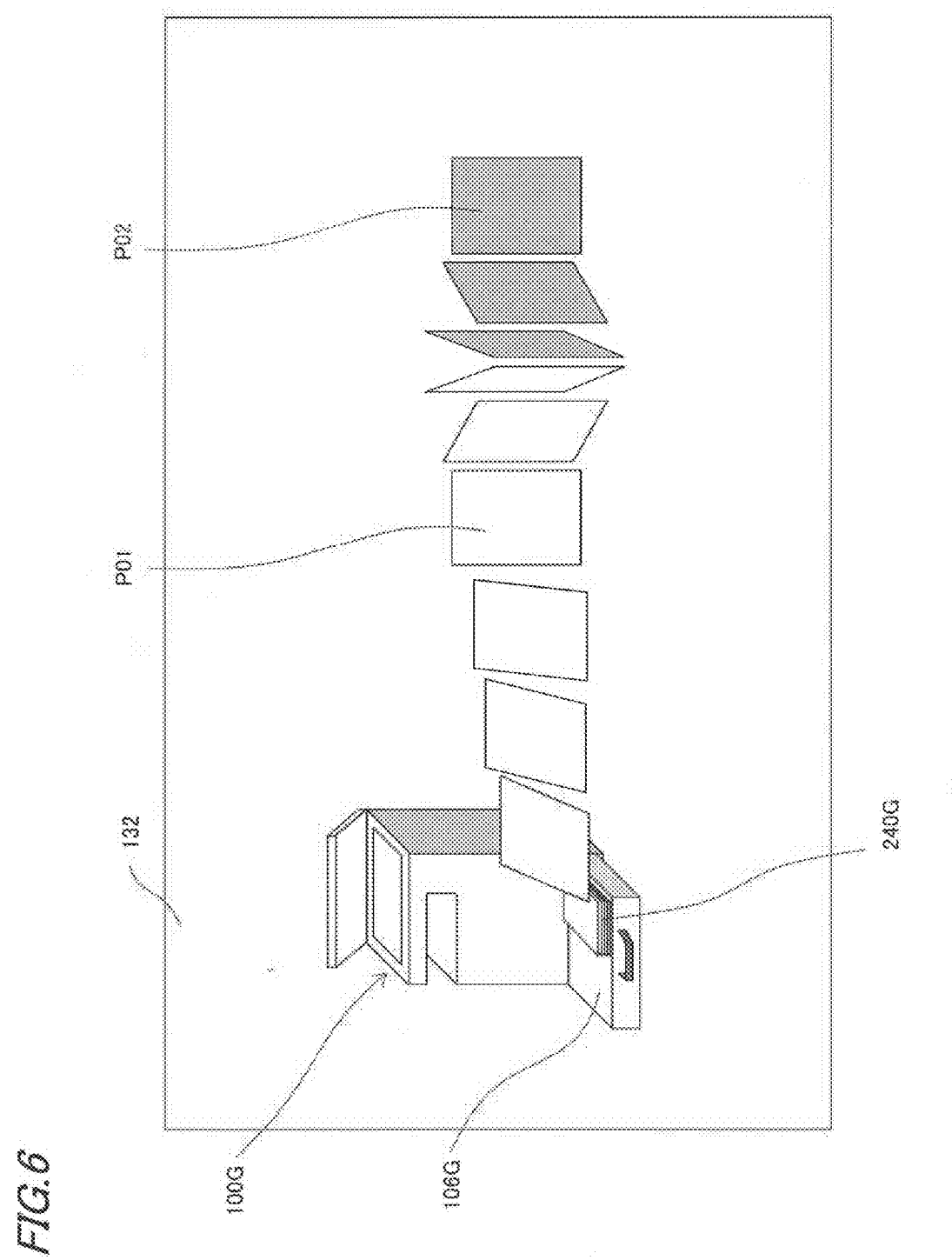
FIG. 6 is an explanatory view showing exemplary display in which a state where printing is performed successively on sheets of paper supplied from a paper supply portion in the case of performing output processing of an image is displayed as a preview image or a confirmation image on a display panel in the image forming apparatus.

FIG. 6 is an explanatory view showing exemplary display in which a state where printing is performed successively on sheets of paper supplied from a paper supply portion in the case of performing output processing of an image is displayed on the display panel 132 as a preview image or a confirmation image in the image forming apparatus of the present embodiment.

In the first embodiment, the display panel 132 of the image forming apparatus 100 displays an image showing a paper supply portion selected by print setting (first display image) and a state where printing is performed successively on sheets of paper (second display image), as shown in FIG. 6.

Specifically, as shown in FIG. 6, a display image 100G showing the image forming apparatus 100 (FIG. 1), a display image 106G showing the paper feed portion 106 (FIG. 1) of the image forming apparatus 100, and a display image 240G showing a paper supply portion selected by a user from among the plurality of paper supply portions (the plurality of paper cassettes 240 (FIG. 2) in the paper feed portion 106 and the manual tray 242 (FIG. 2)) (in this case, one paper cassette 240 among the plurality of paper cassettes 240) are displayed on the display panel 132 as the first display image.

Here, based on an orientation (placement direction) of a document which is one of information detected by the sensor portion 119, by reflecting a size (A3, A4, ...) and a placement direction (portrait layout/landscape layout) of a sheet of paper stored in one paper cassette 240 among the plurality of paper cassettes 240 in the paper feed portion 106, the display image 240G is displayed. The display image 240G is displayed by displaying the paper feed portion 106 in an opened manner for emphasizing so as to be able to be distinguished from other paper cassettes 240 in the paper feed portion 106.

Moreover, on the display panel 132, a plurality of display images P01 each showing a front side of a sheet of paper which is successively supplied and output from a state of being stored in the paper cassette 240 and a plurality of display images P02 each showing a back side of the sheet of paper are displayed as the second display image on the same screen as the display screen on which the display image 240G showing the paper cassette 240 is displayed.

In the display images P01 each showing a front side of a sheet of paper and the display images P02 each showing a back side of a sheet of paper, an image to which print setting described above is reflected is displayed (which will be described below specifically).

Here, description will be given for display of the image to which print setting is reflected in the image forming apparatus 100 with reference to drawings.

Figure 7:
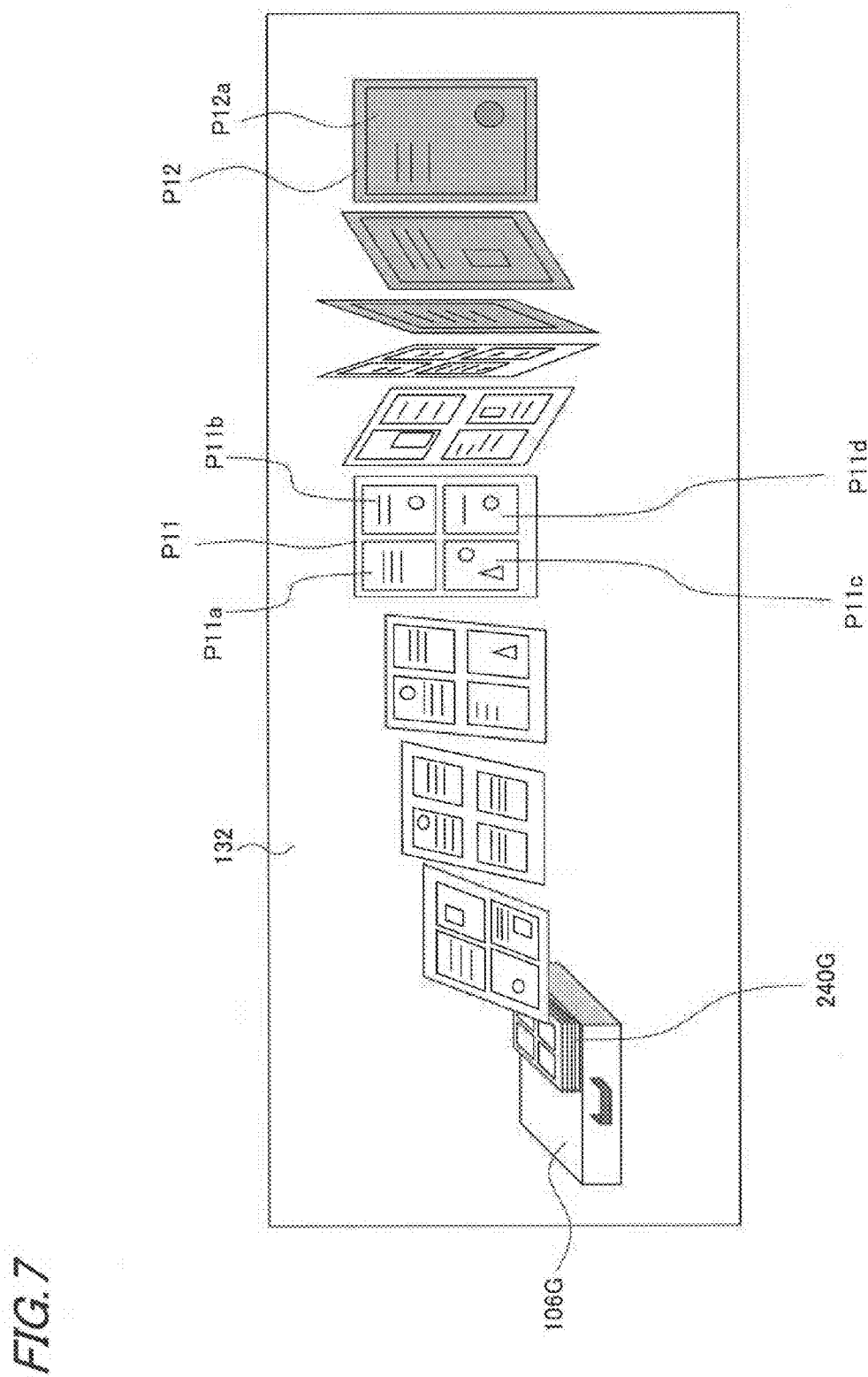
FIG. 7 is an explanatory view showing preview display of an example 1 in which print setting is reflected to an image of a document in the image forming apparatus.
Figure 8:
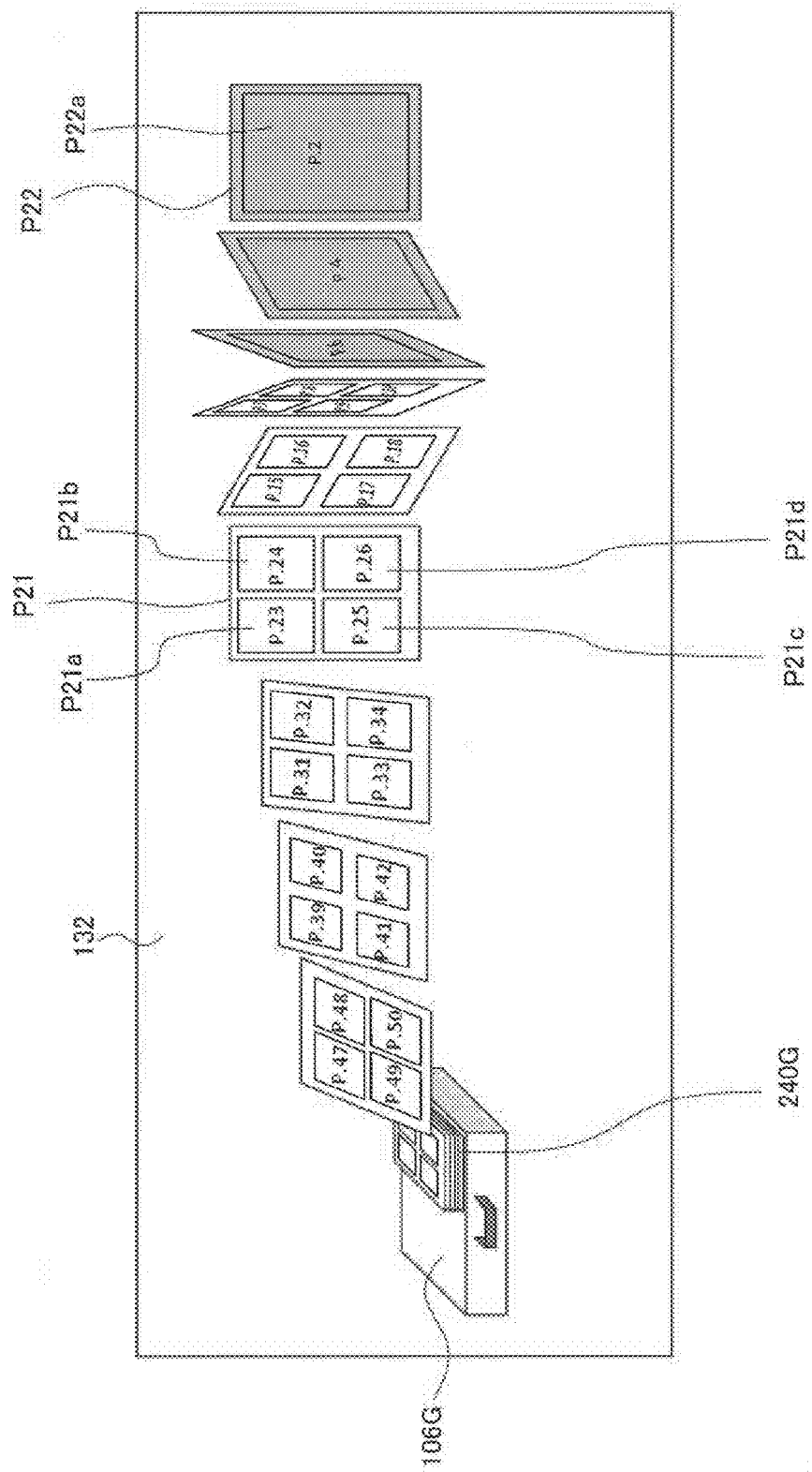
FIG. 8 is an explanatory view showing display of a confirmation image of an example 2 in which print setting is reflected to an image of a document in the image forming apparatus.

FIG. 7 is an explanatory view showing display of a preview image of an example 1 in which print setting is reflected to an image of a document in the image forming apparatus of the first embodiment. FIG. 8 is an explanatory view showing display of a confirmation image of an example 2 in which print setting is reflected to an image of a document in the image forming apparatus.

Example 1

In the example 1, as print setting of the image forming apparatus 100, duplex printing is set to "simplex printing/duplex printing), "4 in 1" is set to a front side of a sheet of paper (setting 4 to N above to arrange images of 4 pages in 1 page), and normal printing, that is, "1 in 1" (setting 1 to N above to arrange an image of 1 page in 1 page) is set to a back side of the sheet of paper.

In the example 1, as shown in FIG. 7, a plurality of display images P11 (preview images) each showing a front side of a sheet of paper which is successively supplied and output from a state of being stored in the paper cassette 240 and a plurality of display images P12 (preview images) each showing a back side of the sheet of paper are displayed as the second display image on the same screen as the display screen on which a display image 106G showing the paper feed portion 106 (FIG. 1) of the image forming apparatus 100 (FIG. 1) and a display image 240G showing the paper cassette 240 selected by a user from among the plurality of paper cassettes 240 (FIG. 2) in the paper feed portion 106 are displayed as the first display image on the display panel 132.

Here, the number of the display images P11 and P12 (preview images) to be displayed is not limited. Moreover, for the display image P12 (preview image showing a back side of a sheet of paper), a color of an entire page is differentiated from the display image P11 (preview image showing a front side of a sheet of paper). As a method for differentiating the color, for example, the display image P12 (preview image showing a back side of a sheet of paper) may be displayed with dots added or may be highlighted. In this manner, the second display image (display images P11 and P12) is displayed by distinguishing a front and a back of a sheet of paper supplied from the specified paper supply portion.

In the example 1, images P11a, P11b, P11c and P11d of a document of 4 pages are arranged being reduced in the display image P11 (preview image) showing a front side of a sheet of paper. An image P12a of a document of 1 page is arranged in the display image P12 (preview image) showing a back side of a sheet of paper.

In this manner, according to the example 1, since the display images P11 and P12 in which images of the document are reduced and displayed are displayed as preview images on the display panel 132, it is possible to notify a user from which paper supply portion in the image forming apparatus 100 a sheet of paper is supplied and on which side of the sheet of paper in a state of being stored in the paper supply portion how and what image is printed, before actual printing.

Example 2

In the example 2, as print setting of the image forming apparatus 100, duplex printing is set to "simplex printing/duplex printing), "4 in 1" is set to a front side of a sheet of paper (setting 4 to N above to arrange images of 4 pages in 1 page), normal printing, that is, "1 in 1" (setting 1 to N above to arrange an image of 1 page in 1 page) is set to a back side of the sheet of paper, and this print setting is reflected to a sample image which is set in advance (page number image).

In the example 2, as shown in FIG. 8, on the display panel 132, a plurality of display images P21 (confirmation images) each showing a front side of a sheet of paper which is successively supplied and output from a state of being stored in the paper cassette 240 and a plurality of display images P22 (confirmation images) each showing a back side of the sheet of paper are displayed as the second display image on the same screen as the display screen on which a display image 106G showing the paper feed portion 106 (FIG. 1) of the image forming apparatus 100 (FIG. 1) and a display image 240G showing the paper cassette 240 selected by a user from among the plurality of paper cassettes 240 (FIG. 2) in the paper feed portion 106 are displayed as the first display image.

Here, the number of the display images P21 and P22 (confirmation images) to be displayed is not limited. Moreover, for the display image P22 (confirmation image showing a back side of a sheet of paper), a color of an entire page is differentiated from the display image P21 (confirmation image showing a front side of a sheet of paper). As a method for differentiating the color, for example, the display image P22 (confirmation image showing a back side of a sheet of paper) may be displayed with dots added or may be highlighted. In this manner, the second display image (display images P21 and P22) is displayed by distinguishing a front and a back of a sheet of paper supplied from the specified paper supply portion.

In the example 2, page number images P21a, P21b, P21c and P21d (sample images) showing a position of each image of 4 pages are arranged in the display image P21 (confirmation image) showing a front side of a sheet of paper. A page number image P22a (sample image) showing a position of an image of 1 page is arranged in the display image P22 (confirmation image) showing a back side of a sheet of paper. The page number image displays a page number. Any display of the page number image is possible as long as showing a page number.

In this manner, according to the example 2, since the display images P21 and P22 in which a page layout is displayed are displayed as the confirmation images on the display panel 132, it is possible to clearly notify a user from which paper supply portion in the image forming apparatus 100 a sheet of paper is supplied and on which side of the sheet of paper in a state of being stored in the paper supply portion what arrangement of printing is performed, before actual printing.

In this manner, according to the image forming apparatus 100 of the first embodiment, since the display image 240G showing the paper cassette 240, the plurality of display images P01 each showing a front side of a sheet of paper which is successively supplied and output from a state of being stored in the paper cassette 240 and the plurality of display images P02 each showing a back side of the sheet of paper are displayed simultaneously on the same screen of the display panel 132, it is possible to notify a user from which paper supply portion in the image forming apparatus 100 a sheet of paper is supplied and on which side of the sheet of paper in a state of being stored in the paper supply portion what image is printed, before actual printing. This makes it possible for the user to grasp a finished state of printing intuitively.

Note that, though a printed state is simply displayed for previewing on the display panel 132 in the image forming apparatus 100 of the first embodiment, for highlighting a paper supply portion to be used, the paper supply portion and information of a sheet of paper stored therein may be displayed by balloon display, pop-up display, or the like.

As configured as above, according to the first embodiment, since the image forming apparatus 100 includes the specified display image generating function 1371 and the paper display image generating function 1372 as the configuration of the display image generating portion 137, and the specified paper supply portion displaying function 1311 and the output state displaying function 1312 as the configuration of the operation unit side control portion 131, in which, before outputting an image to a sheet of paper supplied from a specified paper supply portion (paper supply portion to be used), a first display image showing the specified paper supply portion and a second display image showing a state or a situation where the image is formed on the sheet of paper supplied from the specified paper supply portion are displayed for previewing on the display panel 132, and therefore it is possible to notify a user from which paper supply portion in the image forming apparatus 100 a sheet of paper is supplied and on which side of the sheet of paper in a state of being stored in the paper supply portion what image is printed, before actual printing. Accordingly, the user is able to grasp a finished state of printing intuitively. This makes it possible to store a sheet of paper without mistaking an orientation of the sheet of paper and front/back of a printing side. Moreover, for example, when overwriting printing is performed for a sheet of paper which has been printed before, it is possible to eliminate erroneous setting of a paper storage direction and a position of front and back.

Further, according to the first embodiment, since a paper supply portion selected by a user is displayed so as to be able to be distinguished from the other paper supply portions as the specified paper supply portion, it is possible to eliminate such an erroneous output that a sheet of paper is output from an unintended paper supply portion or output is performed with an unintended paper size.

Further, according to the first embodiment, a paper supply portion and sheets of paper to be supplied are displayed on the same screen of the display panel 132 so that a plurality of sheets of paper are displayed for previewing successively from the paper supply portion, and therefore it is possible to easily confirm from which paper supply portion in the image forming apparatus 100 a sheet of paper is supplied and how it is output.

Further, according to the first embodiment, since content of print setting set by the user is reflected for preview display to the display image showing a sheet of paper which is displayed for previewing (second display image), it is possible to prevent printing for a printing side and a printing direction which are not intended by the user.

Note that, though the display image showing a paper supply portion (first display image) and the display image showing a sheet of paper which is supplied and output from the paper supply portion (second display image) are displayed for previewing on the same screen of the display panel 132 in the image forming apparatus 100 of the first embodiment, preview display is not limited thereto in the present invention.

Second Embodiment

Next, description will be given for a second embodiment of the present invention.

Figure 9:
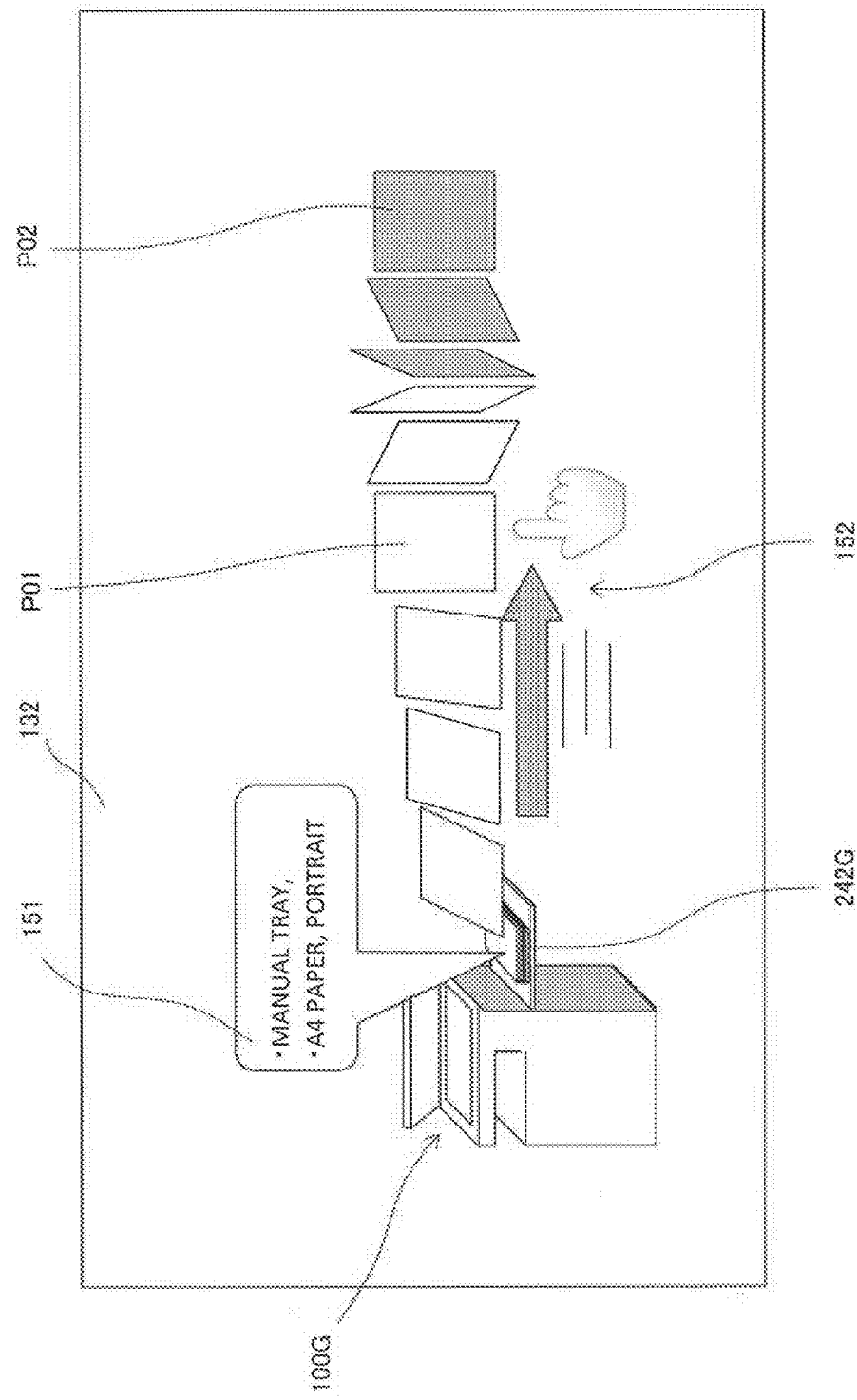
FIG. 9 is an explanatory view showing an example of preview display displayed on a display panel of an image forming apparatus according to a second embodiment of the present invention.

FIG. 9 is an explanatory view showing an example of preview display displayed on a display panel of an image forming apparatus according to the second embodiment of the present invention.

In the second embodiment, as shown in FIG. 9, it is set to a sheet of paper such that a sheet of paper is supplied from the manual tray 242, and a display image 100G showing the image forming apparatus 100 (FIG. 1) and a display image 242G showing a paper supply portion selected by a user from among the plurality of paper supply portions of the image forming apparatus 100 (the plurality of paper cassettes 240 (FIG. 2) in the paper feed portion 106 and the manual tray 242 (FIG. 2)) (in this case, the manual tray 242) are displayed as a first display image on the display panel 132.

In the second embodiment, a balloon display 151 for highlighting the display image 242G showing the manual tray 242 selected by the user is displayed on the display panel 132.

In the balloon display 151, a name of the paper supply portion (manual tray) and information of a sheet of paper which is stored (A4 paper, portrait) are displayed. This makes it possible to understand information of the paper supply portion which is set and information of the sheet of paper more easily.

Further, in the second embodiment, as shown in FIG. 9, by performing a flick operation 152 (step 7 of FIG. 4 or step 14 of FIG. 5) to a right direction from a vicinity of the display image 242G of the manual tray 242 on the touch panel 134 of the display panel 132, such an animation is displayed that sheets of paper on which images due to be output from the manual tray 242 (display image 242G) (display images P01, P02 (preview images of FIG. 7 or confirmation images of FIG. 8) are successively displayed in a coming up manner as a second display image. The flick operation 152 is an operation for sliding a finger touching the display screen. This makes it possible to confirm a state where a plurality of sheets of paper are printed successively before actual printing.

Moreover, when duplex printing is set, as shown in FIG. 9, display of sheets of paper (front/back) may be rotated so as to shift from the display image P01 to the display image P02 in the process of the animation display so that it is possible to confirm content due to be printed on a back side when viewed from a side at the time of being stored in a tray.

Here, the number of the display images P01 and P02 to be displayed is not limited. Moreover, for the display image P02 (back side), a color of an entire page is differentiated from the display image P01 (front side). As a method for differentiating the color, for example, the display image P02 (back side) may be displayed with dots added or may be highlighted. In this manner, the second display image (display images P01 and P02) is displayed by distinguishing a front and a back of a sheet of paper supplied from the specified paper supply portion.

Third Embodiment

Next, description will be given for a third embodiment of the present invention with reference to a drawing.

Figure 10:
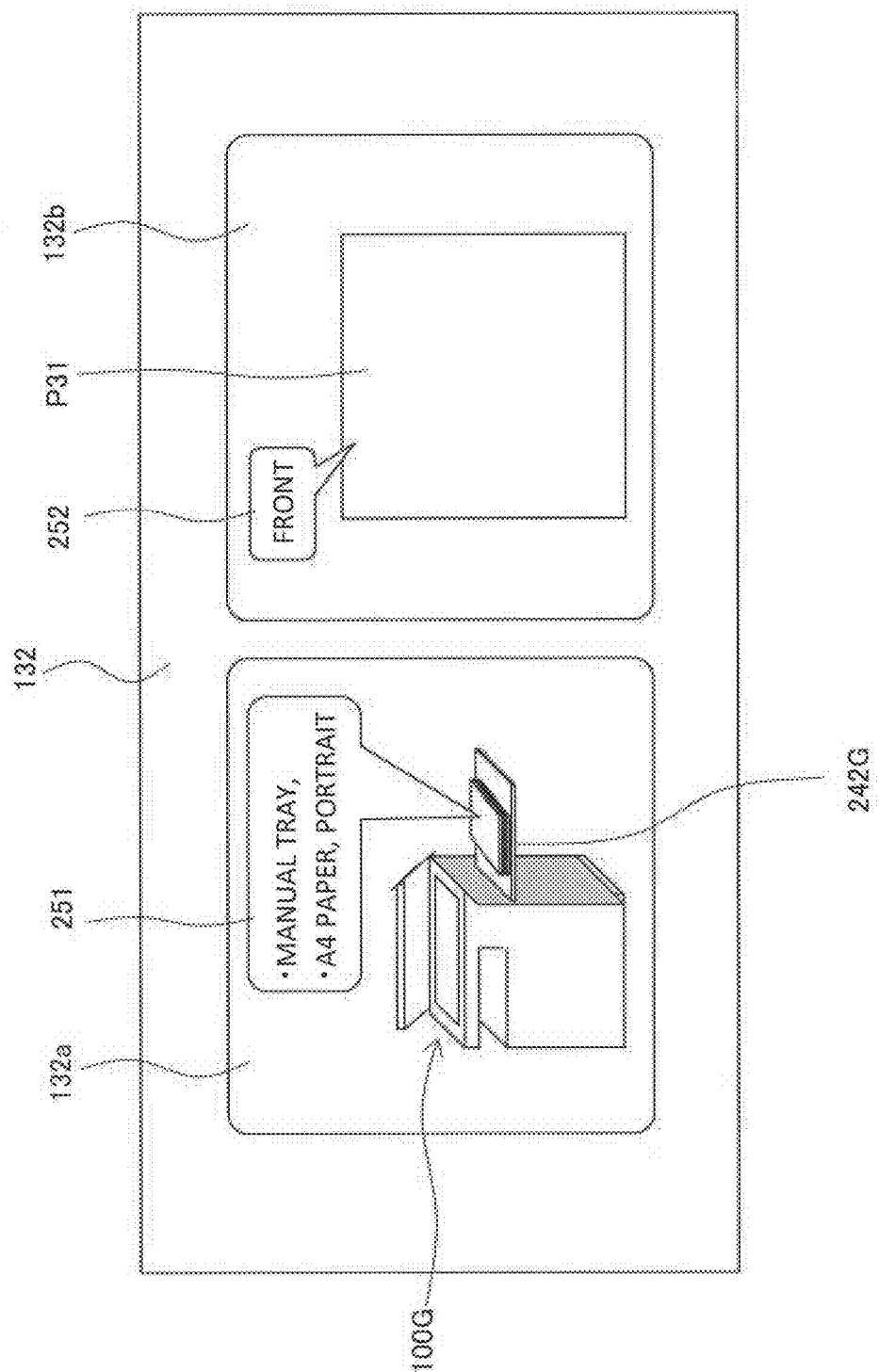
FIG. 10 is an explanatory view showing an example in which preview display is provided separately for a paper supply portion which supplies a sheet of paper and a sheet of paper to be printed in the case of performing output processing in an image forming apparatus according to a third embodiment of the present invention.

FIG. 10 is an explanatory view showing an example in which preview display is provided separately for a paper supply portion which supplies a sheet of paper and a sheet of paper to be printed in the case of performing output processing in an image forming apparatus according to the third embodiment of the present invention.

In the third embodiment, differently from a mode that a preview is displayed on the display panel 132 in the first embodiment, an image showing a paper supply portion which is selected by print setting and an image showing a front side of a sheet of paper are displayed separately on the display panel 132 of the image forming apparatus 100 (FIG. 1), as shown in FIG. 10.

Specifically, the display panel 132 is provided with a first display portion 132a and a second display portion 132b.

A display image 100G showing the image forming apparatus 100 and a display image 242G showing a paper supply portion selected by a user from among the plurality of paper supply portions of the image forming apparatus 100 (the plurality of paper cassettes 240 (FIG. 2) in the paper feed portion 106 and the manual tray 242 (FIG. 2)) (in this case, the manual tray 242) are displayed as a first display image on the first display portion 132a.

In addition, a balloon display 251 for highlighting the display image 242G showing the manual tray 242 selected by the user is displayed on the first display portion 132a. In the balloon display 251, a name of the paper supply portion (manual tray) and information of a sheet of paper which is stored (A4 paper, portrait) are displayed. This makes it possible to understand information of the paper supply portion which is set and information of the sheet of paper more easily.

A display image P31 (preview image of FIG. 7 or confirmation image of FIG. 8) that an image is formed on a front side (top side) of a sheet of paper placed on the manual tray 242 is displayed as a second display image on the second display portion 132b. An image to which print setting is reflected is displayed in the display image P31 showing a front side of the sheet of paper.

Further, a balloon display 252 for highlighting the front side of the sheet of paper is displayed on the second display portion 132b. In the balloon display 252, "front" showing the front side of the sheet of paper is displayed. Thereby, it is clarified that the side on which the display image P31 is displayed is the front side of the sheet of paper.

As configured as above, according to the third embodiment, the display panel 132 is provided with the first display portion 132a and the second display portion 132b, and the display image 242G showing a paper supply portion from which a sheet of paper is supplied is displayed on the first display portion 132a and the display image P31 showing an output state of a sheet of paper to be output is displayed on the second display portion 132b, so that it is possible to notify a user from which paper supply portion in the image forming apparatus 100 a sheet of paper is supplied and on which side of the sheet of paper in a state of being stored in the paper supply portion what image is printed, before actual printing. This makes it possible for the user to grasp a finished state of printing intuitively. Moreover, it is possible to store a sheet of paper in a paper supply potion without mistaking an orientation of the sheet of paper and front/back of a printing side.

Fourth Embodiment

Next, description will be given for a fourth embodiment of the present invention with reference to a drawing.

Figure 11:
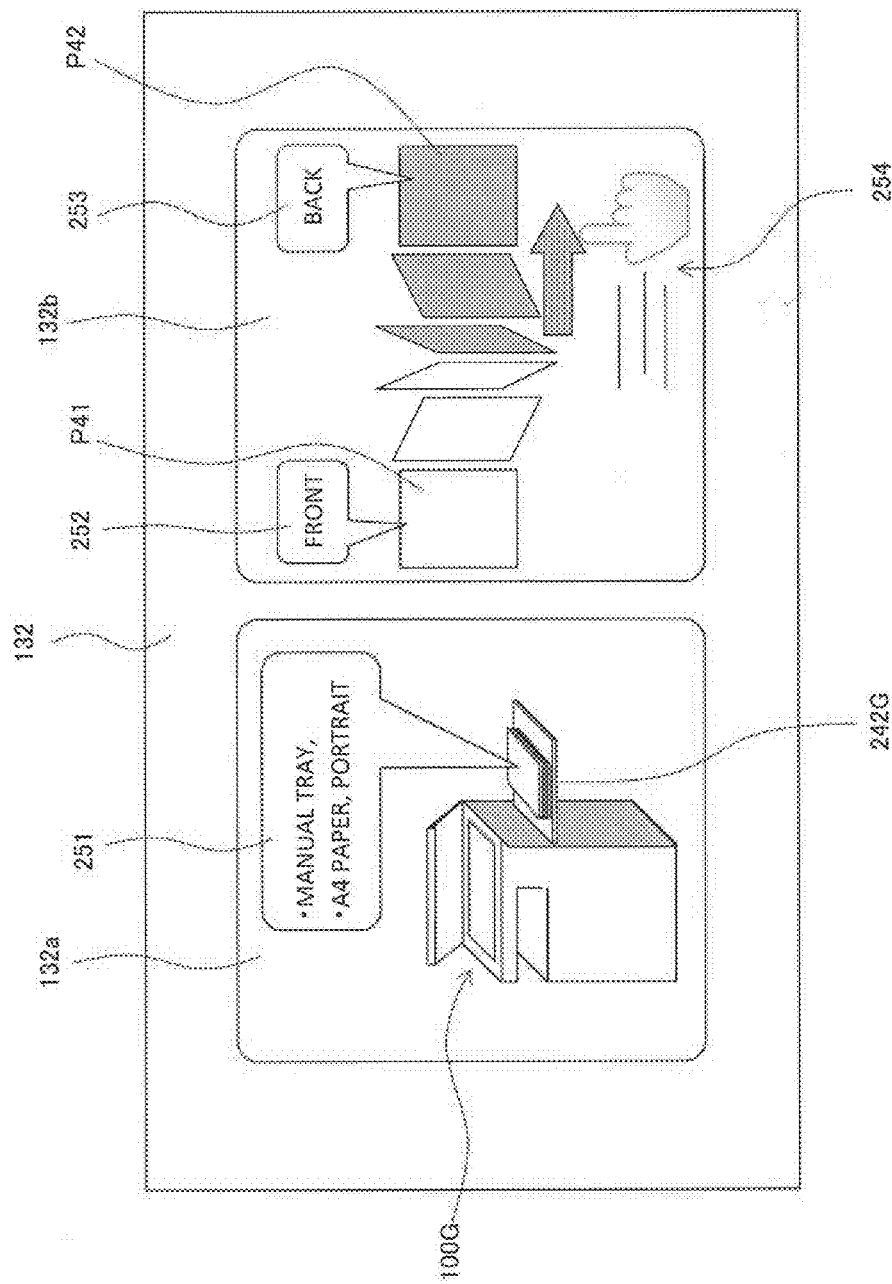
FIG. 11 is an explanatory view showing a modification example of preview display displayed on a display panel of an image forming apparatus according to a fourth embodiment of the present invention.

FIG. 11 is an explanatory view showing an example of preview display displayed on a display panel of an image forming apparatus according to the fourth embodiment of the present invention.

In the fourth embodiment, as shown in FIG. 11, similarly to the first display portion 132a of the third embodiment described above, a display image 100G showing the image forming apparatus 100, a display image 242G showing a paper supply portion selected by a user from among the plurality of paper supply portions of the image forming apparatus 100 (the plurality of paper cassettes 240 (FIG. 2) in the paper feed portion 106 and the manual tray 242 (FIG. 2)) (in this case, the manual tray 242), and a balloon display 251 for highlighting the display image 242G are displayed as a first display image on the first display portion 132a.

A plurality of display images P41 each showing a front side of a sheet of paper which is successively supplied and output and a plurality of display images P42 each showing a back side of the sheet of paper are displayed as a second display image on the second display portion 132b.

In addition, balloon displays 252 and 253 for highlighting front and back sides of a sheet of paper are displayed. In the balloon display 252, "front" showing the front side of the sheet of paper is displayed. In the balloon display 253, "back" showing the back side of the sheet of paper is displayed. Thereby, front/back sides of the sheet of paper displayed for previewing are clarified.

Further, in the fourth embodiment, as shown in FIG. 11, by performing a flick operation 254 (step S7 of FIG. 4 or step S14 of FIG. 5) to a right direction from left in the figure on the display screen in the second display portion 132b of the display panel 132, such an animation is displayed that a plurality of sheets of paper to be output (display images P41, P42 (preview images of FIG. 7 or confirmation images of FIG. 8)) are successively displayed as a second display image. The flick operation 254 is an operation for sliding a finger touching the display screen. This makes it possible to confirm a state where a plurality of sheets of paper are printed successively before actual printing.

Moreover, when duplex printing is set, as shown in FIG. 11, display of sheets of paper (front/back) may be rotated so as to shift from the display image P41 to the display image P42 in the process of the animation display so that it is possible to confirm content due to be printed on a back side when viewed from a side at the time of being stored in a tray.

Here, the number of the display images P41 and P42 to be displayed is not limited. Moreover, for the display image P42 (back side), a color of an entire page is differentiated from the display image P41 (front side). As a method for differentiating the color, for example, the display image P42 (back side) may be displayed with dots added or may be highlighted. In this manner, the second display image (display images P41 and P42) is displayed by distinguishing a front and a back of a sheet of paper supplied from the specified paper supply portion.

As configured as above, according to the fourth embodiment, animation display of a plurality of sheets of paper successively from the paper supply portion is provided on the second display portion 132b of the display panel 132, so that it is possible to easily confirm how output is performed.

Note that, though the display image 242G showing a paper supply portion from which a sheet of paper is supplied is displayed as well as the display image P41 showing a state where an image is formed on a sheet of paper supplied from the paper supply portion is displayed on the display panel 132 of the image forming apparatus 100 in the embodiment described above, it is also possible, by developing the present invention, to configure such that by performing a tap operation (selecting operation) for a paper supply portion which is not selected currently in the image of the main body of the image forming apparatus on the display screen displayed on the display panel 132, a sheet of paper which is set is changed.

The tap operation is an operation for selecting a paper supply portion which is not selected currently by tapping the display screen once with a finger. Moreover, the selecting operation includes, in addition to the above-described tap operation, a long-tap operation for pressing the display screen with a finger for a while (for example, for a second or more), a double-tap operation for tapping the display screen twice with a finger, and the like.

In this case, information read by the sensor portion 119 is reflected to preview display again, so that the display image of the paper feed portion 106 which is displayed in an opened manner or the display image 242G showing the manual tray 242 which is highlighted, and contents of information of a paper supply portion which is newly set and information of a sheet of paper, which are displayed in the balloon display are changed.

As described above, the present invention is not limited to the above-described embodiments, and various changes are allowed in the scope shown in the claims. It is obvious that a person skilled in the art thinks out various change examples or modification examples within a category described in the claims, that is, embodiments that are obtained in combination with technical means changed as appropriate in the scope without departing from the spirit and scope of the present invention are also included in a technical scope of the present invention.

What is claimed is:

1. An image forming apparatus, comprising:
    paper supply portions provided at a plurality of places for supplying a sheet of paper;
    an image output portion for forming and outputting an image based on image data which is input on a sheet of paper supplied from a first paper supply portion which is specified from among the plurality of paper supply portions; and
    an image display operation device, wherein
    the image display operation device includes
    a display image generating portion for generating a display image based on the image data before outputting the image to the sheet of paper supplied from the first paper supply portion,
    a display portion, and
    a display control portion for displaying the display image on the display portion,
    the display image generating portion includes
    a function for generating a first display image showing the first paper supply portion, and
    a function for generating a second display image showing a state where the image is formed on the sheet of paper supplied from the first paper supply portion when the image data is input as a preview image or a state where a sample image is formed on the sheet of paper before the image data is input as a confirmation image, and
    the display control portion includes
    a function for displaying a preview of the first display image on the display portion, and
    a function for displaying a preview of the second display image.

2. The image forming apparatus according to claim 1, wherein
    the display control portion includes
    a function for displaying, on the display portion, a paper supply portion in which a sheet of paper selected as a sheet of paper for printing by a user is stored so as to be able to be distinguished from the other paper supply portions.

3. The image forming apparatus according to claim 2, wherein
    the display control portion includes
    a function for reflecting content of a print setting set by the user to the second display image for preview display.

4. The image forming apparatus according to claim 3, wherein
    the display control portion includes
    a function for displaying to distinguish a front of the sheet of paper from a back of the sheet of paper in the second display image.

5. The image forming apparatus according to claim 2, wherein
    the display control portion includes
    a function for displaying to distinguish a front of the sheet of paper from a back of the sheet of paper in the second display image.

6. The image forming apparatus according to claim 1, wherein
    the display control portion includes
    a function for reflecting content of a print setting set by a user to the second display image for preview display.

7. The image forming apparatus according to claim 6, wherein
    the display control portion includes
    a function for displaying to distinguish a front of the sheet of paper from a back of the sheet of paper in the second display image.

8. The image forming apparatus according to claim 1, wherein
    the display control portion includes a function for displaying to distinguish a front of the sheet of paper from a back of the sheet of paper in the second display image.

* * * * *